United States Patent [19]

Willinger et al.

[11] 3,791,346
[45] Feb. 12, 1974

[54] RODENT HABITAT

[75] Inventors: Allan H. Willinger, New Rochelle; Albert J. Dinnerstein, Far Rockaway, both of N.Y.

[73] Assignee: Metaframe Corporation, Maywood, N.J.

[22] Filed: Jan. 21, 1972

[21] Appl. No.: 219,767

[52] U.S. Cl. .................... 119/17, 119/1, 119/15
[51] Int. Cl. ............................................. A01k 1/00
[58] Field of Search ................ 119/1, 15, 17, 18, 19

[56] References Cited
UNITED STATES PATENTS

| | | | |
|---|---|---|---|
| 1,576,462 | 3/1926 | Polzin | 119/5 |
| 3,653,357 | 4/1972 | Sheidlower | 119/1 |
| 3,742,908 | 7/1973 | Merino | 119/15 |
| 3,518,971 | 7/1970 | Gass et al. | 119/18 |
| 2,914,022 | 11/1959 | Hinton | 119/17 |
| 3,367,308 | 2/1968 | Quattrone et al. | 119/18 X |
| 2,002,259 | 5/1935 | Cole | 119/19 |
| 2,795,208 | 6/1957 | Rasmussen | 119/19 X |

Primary Examiner—Hugh R. Chamblee
Attorney, Agent, or Firm—Friedman & Goodman

[57] ABSTRACT

A rodent habitat comprising a transparent plastic housing which includes an open bottom portion. A screen is connected across the open bottom portion of the housing, whereas a shallow tray is provided for receiving the open bottom portion of the housing in detachable relation. An arrangement of adjustable tubes and sub-housing structures are provided for detachable association with the transparent housing and mutual communication with one another.

39 Claims, 22 Drawing Figures

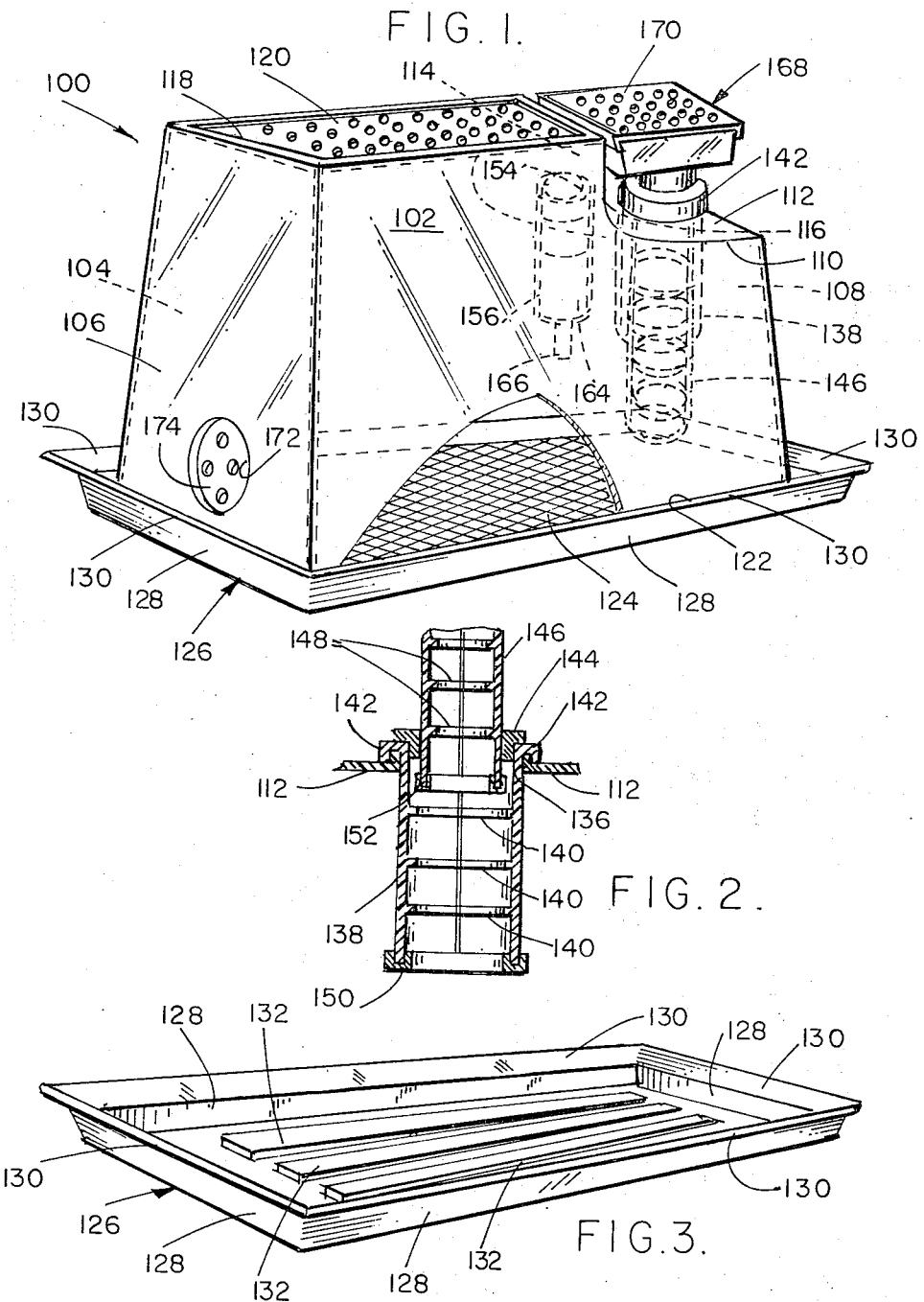

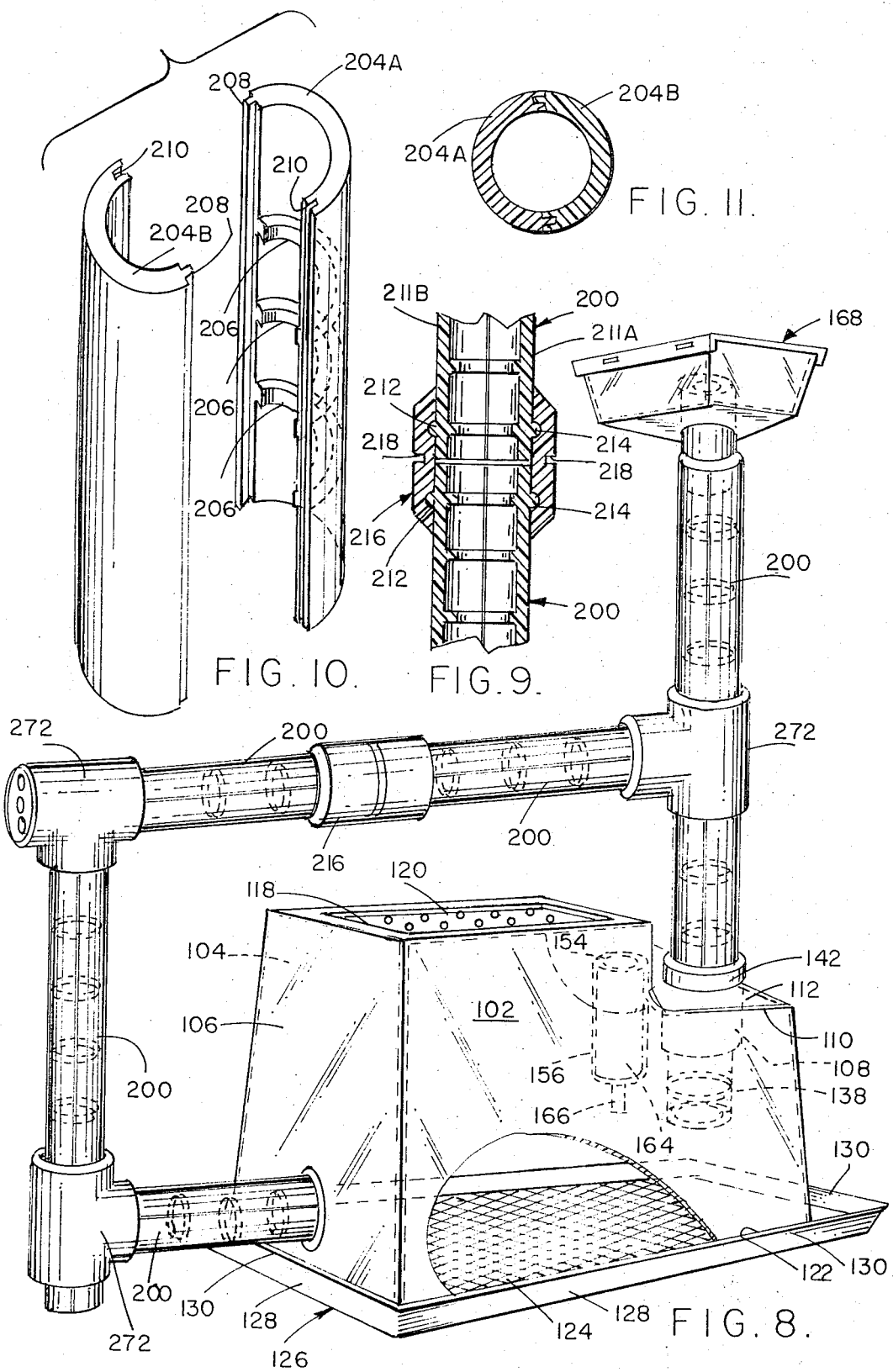

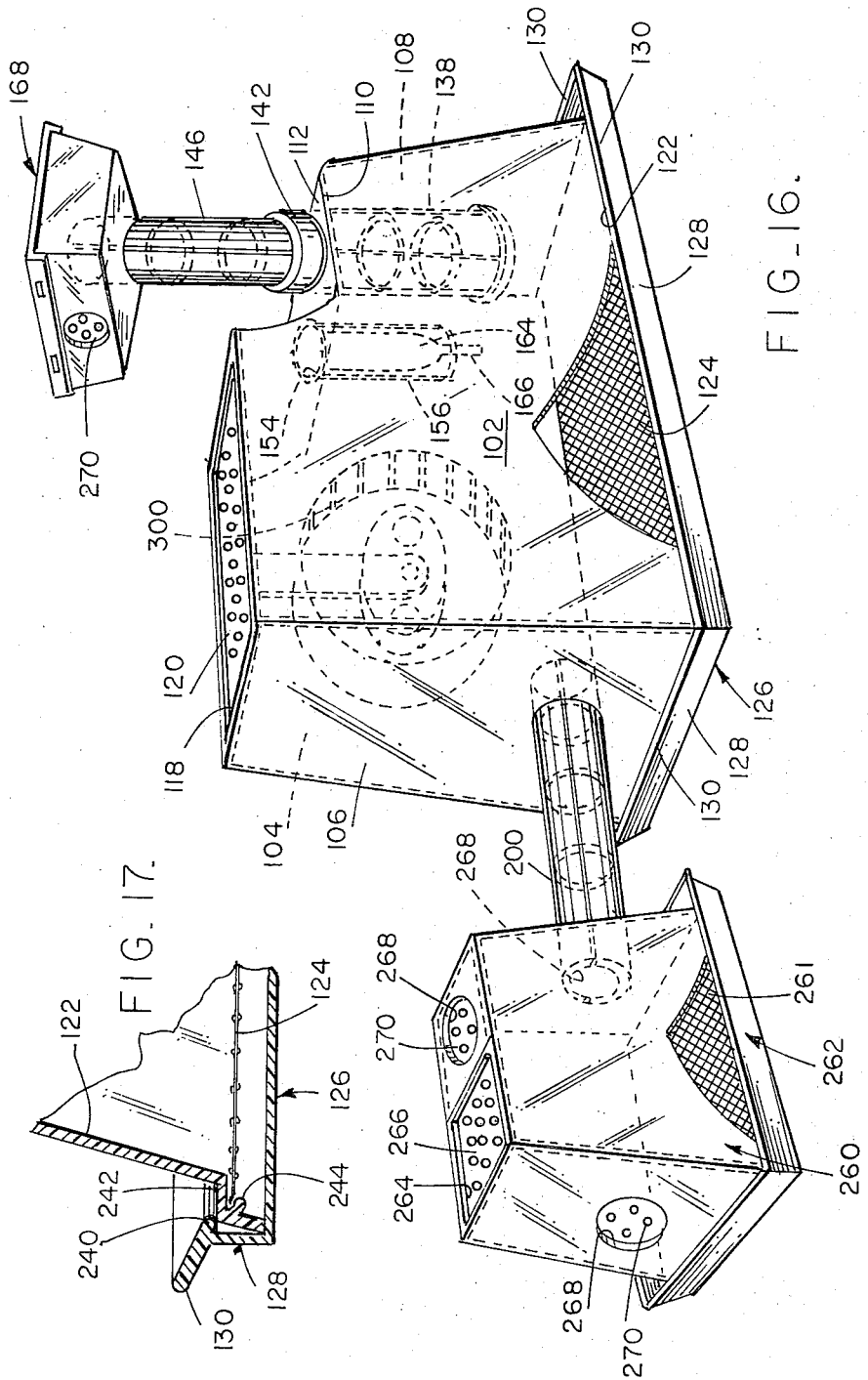

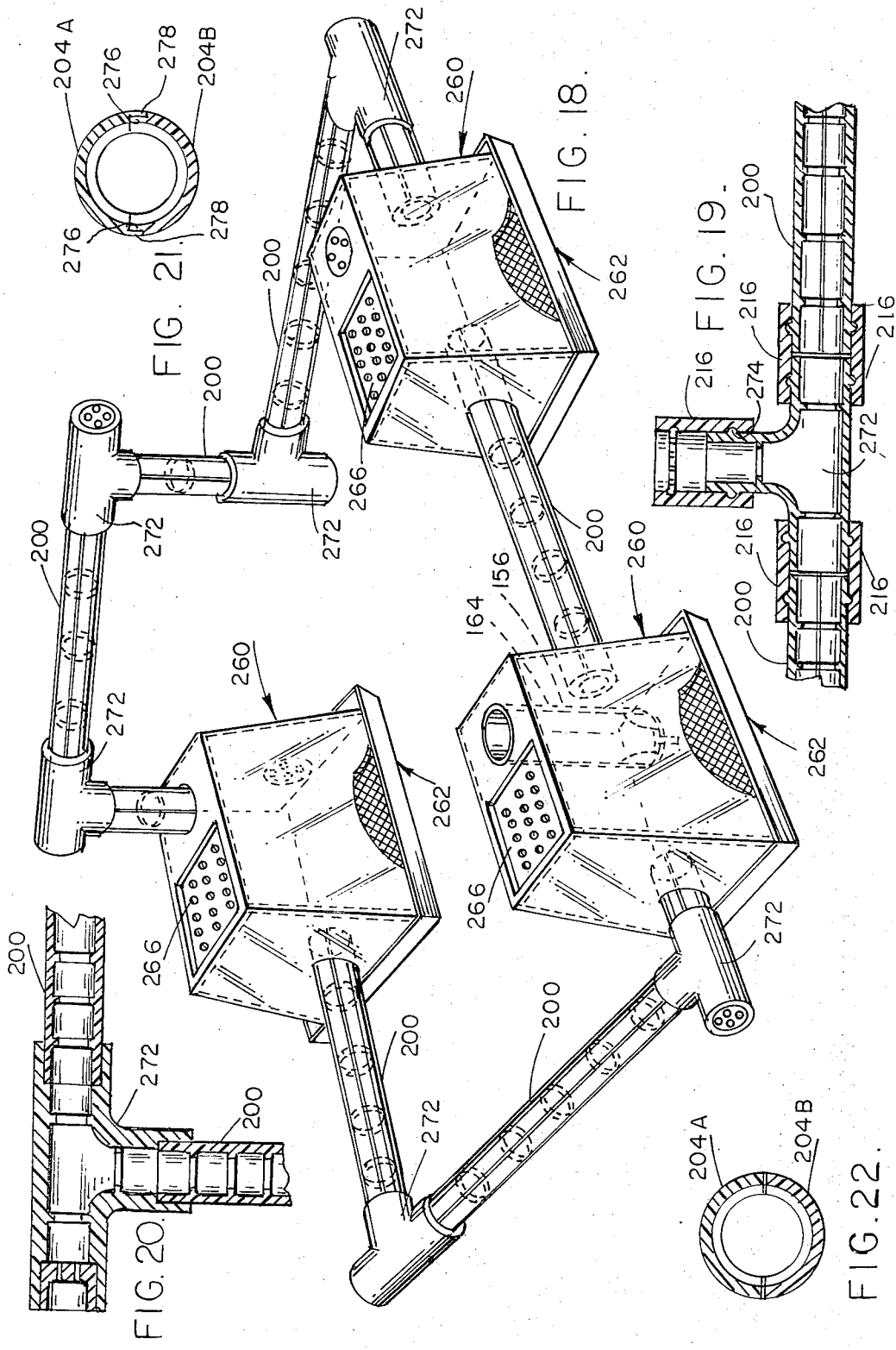

RODENT HABITAT

BACKGROUND OF THE INVENTION

The present invention relates generally to structure for use by hobbyists and the like for confining animals of rodent variety, and more particularly to an animal or rodent habitat which may be assembled, disassembled and rearranged selectively in generally any manner desired by the hobbyist or the like.

As is commonly well known, animals of rodent variety, namely hamsters and like, are often maintained by hobbyists in cages which confine the animal and restrict the animal's movements to a minimal extent. Accordingly, animals maintained in this environment become listless, less active, and fail to provide the excitement and novelty for the hobbyist as when originally purchased and brought into the home or the like.

Moreover, the hobbyist must often resort to freeing the animal or rodent from its cage environment, thereby, subjecting himself to a substantial degree of difficulty in attempting to recapture the rodent thereafter. Accordingly, the mere provision of cages and the like for maintaining animals of rodent variety is a serious disadvantage.

Another disadvantage associated with the conventional type of cage for confining animals of rodent variety is that the cages themselves are not readily adaptable for being easily dismantled for permitting cleaning of the cage of animal excrement and other debris while the animal itself is still maintained or isolated within the cage and prevented from escaping.

Still another disadvantage associated with the conventional type of cage is that animals of rodent variety tend to gnaw at surfaces projecting into the cage and, therefore, when the cage itself is constituted of transparent plastic having inwardly projecting sharply defined surfaces, the latter surfaces may be gnawed at and damaged by the rodent.

SUMMARY OF THE INVENTION

Accordingly, it is an object of the present invention to provide an animal or rodent habitat which may be assembled, disassembled and rearranged selectively for encouraging rodents and the like to remain active in generally universally observable relation.

It is another object to provide a primary housing and auxiliary or sub-housings each of which may be readily cleaned while the animal is maintained within the respective housings.

It is another object to provide conduits or tubes which themselves may be dismantled into mating segments or the like to permit cleaning of the interior thereof, the interior including a roughened or textured surface for permitting animals to climb upwardly therealong.

It is still a further object to provide elastomeric coupling sleeves for joining the tubes and housings relative to one another to obviate possible fracture or breakage of the interconnected portions of the tubes and housings with one another.

it is still another object of the present invention to provide surfaces which project inwardly of the respective housings which are sufficiently curved in nature so as to be generally gnaw resistant, and to provide generally metallic blinds or discs for detachable association with respective coupling openings in the various housings to likewise resist gnawing of these openings by rodents confined in the respective housings.

It is an additional object of the present invention to provide conduits or tubes which are telescopically associated with one another for permitting ready adjustment of these tubes both lengthwise and heightwise with one another in a selective manner by the hobbyist.

It is a further object to provide an external upper concavity in the primary housing to permit supporting of accessories or the like, which accessories are telescopically or slidable adjustable relative to the upper concavity between an operative elevated position and an inoperative lowered position such as for packaging, shipping and the like.

It is still another object of the present invention to provide various auxiliary sub-housings which are tinted, colorwise, so as to permit rodents and the like to generally hide therein, yet permit at least partial observation of the rodent.

Accordingly, the present invention may be characterized as relating generally to an animal habitat comprising an at least partially transparent housing which includes an open bottom portion, a screen connected across said open bottom portion, and tray means operatively associated with said open bottom portion for receiving the latter in detachable relation, said screen acting to generally isolate and maintain an animal in said housing from said tray means when the latter is either attached or detached from said housing.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 illustrates a perspective view of the primary housing of the animal habitat pursuant to the present invention with an auxiliary sub-housing telescopically arranged thereon in a lowered position such as for packaging and shipping or the like;

FIG. 2 illustrates a fragmentary enlarged cross-sectional view, in elevation, of the telescopic arrangement for supporting the auxiliary sub-housing upon the primary housing illustrated in FIG. 1;

FIG. 3 illustrates a perspective view of the shallow tray for association with the front, rear and side walls of the primary housing at the bottom portion of the latter;

FIG. 8 illustrates one manner by which the structure, pursuant to the present invention, may be arranged relative to one another in perspective;

FIG. 9 illustrates an elevational fragmented cross-sectional view of two tubes as joined through the intermediary of an elastomeric coupling sleeve pursuant to an alternate embodiment of the present invention;

FIG. 10 illustrates a pair of semi-annular tube segments, in perspective, for mating with one another;

FIG. 11 illustrates a horizontal cross-sectional view of the mating tube segments pursuant to one embodiment thereof;

FIG. 16 illustrates a perspective view of an alternate arrangement of the present invention incorporating a further auxiliary sub-housing with the primary housing;

FIG. 17 illustrates a fragmentary enlarged elevational cross-sectional view of a corner portion of the primary housing as associated with the tray therefor;

FIG. 18 illustrates a perspective view of a plurality of auxiliary sub-housings as interconnected to one another through the intermediary of communicating tubular members;

FIG. 19 illustrates an enlarged cross-sectional view of the various tubes as joined to one another;

FIG. 20 illustrates a view similar to FIG. 19 of additional tubes in communicating relation with one another;

FIG. 21 illustrates a cross-sectional view of mating tube portions pursuant to an alternate embodiment thereof; and FIG. 22 illustrates still a further embodiment of the mating tube segments with one another.

DETAILED DESCRIPTION OF THE INVENTION

Figures 4, 5, 6, 7:
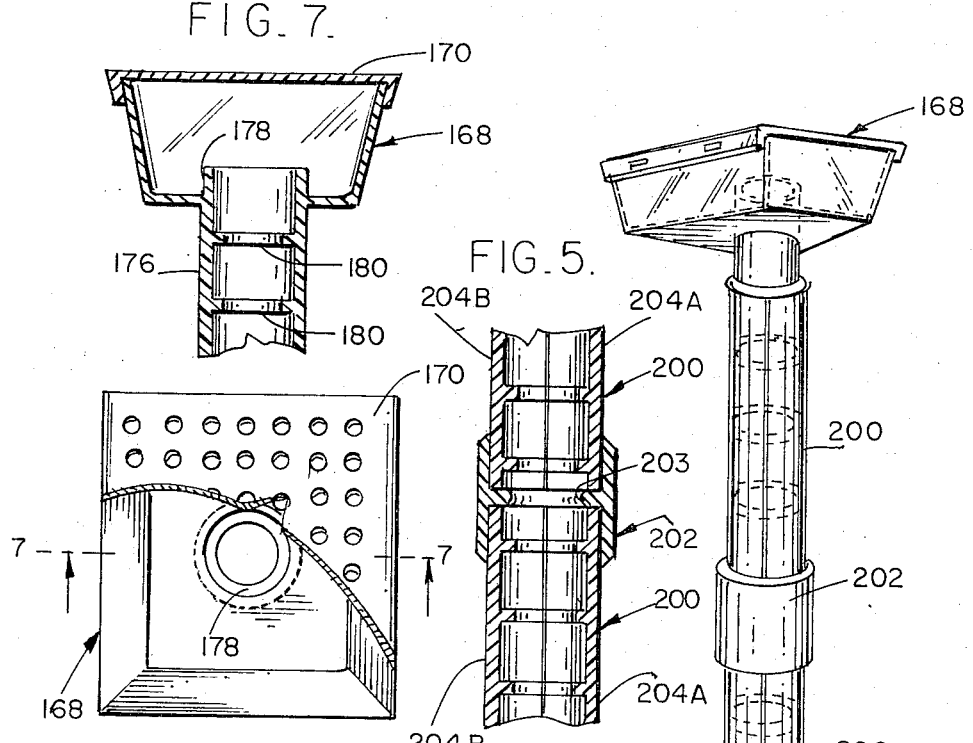
FIG. 4 illustrates a view similar to FIG. 1 with the auxiliary sub-housing in an elevated or raised position.
FIG. 5 illustrates an elevational cross-sectional view of two transparent tubes joined to one another through the intermediary of an elastomeric coupling sleeve pursuant to one embodiment of the present invention.
FIG. 6 illustrates a fragmented plan view of the auxiliary sub-housing illustrated in FIG. 4.
FIG. 7 illustrates a cross-sectional view taken along the line 7—7 in FIG. 6.

Referring now to the drawings, and more particularly to FIGS. 1-3 thereof, the present invention relates generally to an animal or rodent habitat having a primary housing denoted generally by the reference character 100. The primary housing 100 is generally constituted of rigid thermoplastic such as polystyrene, or the like, and is transparent for permitting ready observation of an animal confined therein.

The primary housing 100 includes a tapered front face 102, a tapered rear face 104, a tapered left side face 106 and a smaller, likewise tapered, right side face 108.

Both the front and rear faces 102 and 104 respectively, adjacent the smaller right side face 108, are provided with upper arcuate edges 110 respectively which cooperatively define a generally upper horizontal surface 112 which adjoins an upper generally vertically extending surface 114 through the intermediary of a generally gnaw-resistant rounded transition surface 116 having a radius of curvature of at least one-half inches, the surfaces 112, 114 and 116 cooperatively defining what may be characterized generally as a shoulder of a depressed external concavity upon which may be supported accessories or the like in a manner as will be described below.

Adjacent the generally depressed external concavity aforementioned, the housing 100 is provided with an open top portion 118 across which may be connected, such as by conventional means, namely hinges or a detent arrangement, a perforated metallic plate 120 for permitting ready access through the open top portion 118 into the housing 100. Moreover, the housing 100 is provided with an open bottom portion 122 across which may be connected, in a conventional manner, a screen 124 having respective openings of at least one quarter inches for the purpose as also will be clarified below.

Operatively associated with the open bottom portion 122 of the housing 100, in detachable relation, is a generally shallow tray constituted preferably of an elastomeric thermoplastic such as polypropylene or polyethylene and the like, the tray 126 having generally vertical front, rear and opposing side walls 128 respectively from which integrally extends a surrounding outwardly flaring flange 130, the significance of which will be clarified below. Moreover, internally of the bottom portion of the tray 126 is provided elongate raised rib-like structure 132 against which the screen 124 may rest so as to be maintained substantially in slightly spaced parallel relation with the bottom interior of the tray 126 within a clearance range of approximately one-eighth – one-half inches.

Accordingly, the housing 100 may be readily used for maintaining an animal in captivity without any requirement for removing the animal therefrom when the housing 100 is to be cleaned, such as the removal of animal excrement and other debris therefrom. In this respect, an animal of rodent variety may be inserted into the housing 100 through the open top portion 118 thereof by lifting the perforated plate 120 and, thereafter, reinstating the perforated plate 120 into a closed condition upon the open top portion 118. Since rodents and the like require a soft surface upon which they are to move about, the hobbyist may insert litter constituted of corn cob chips or the like into the housing 100 so as to overlie the bottom interior of the tray 126, extend through the clearance between the screen 124 and bottom interior of the tray 126, and partially overlie the screen 124 so as to provide a soft litter bedding substance upon which the rodent may move about freely.

When it is necessary to remove the waste or other debris from the housing 100, the shallow tray 126, which is operatively associated with the open bottom portion 122 of the housing 100 in ready detachable relation, such as through the provision of detents and the like, may be detached from the housing 100, thereby, permitting the corn cob chips or litter particles having an extent somewhat smaller than the openings in the screen 124, or somewhat less than one quarter inches, to be shaken and passed through the screen 124 into the shallow tray 126, the surrounding outwardly flaring flange 130 acting, in an auxiliary fashion, to retain falling litter particles within the confines of the tray 126 and, thereby, obviating the formation of a messy surrounding environment. Thus, the shallow tray 126 may, thereafter, be emptied for disposal in a convenient manner, the screen 124 acting to isolate and maintain rodent within the confines of the housing 100.

The provision of the cleanance of one-eighth – one-half inches between the screen 124 and the bottom interior of the shallow tray 126 acts to prevent the rodent, who tends to gnaw at especially soft surfaces, from gnawing away at the shallow tray 126 which is preferably constituted of an elastomeric or soft thermoplastic to permit ready attachment and detachment relative to the housing 100. Accordingly, it is likewise contemplated to provide a shallow tray constituted of generally rigid thermoplastic, and having appropriate dentents and the like for permitting ready attachment and detachment relative to the housing 100, likewise. However, in this instance, the screen 124 need not necessarily be spaced from the bottom interior of the tray 126 since in this instance the generally rigid nature or hardened nature of the tray 126, when constituted such as of polystyrene or the like, will not necessarily be subjected to substantial damage due to gnawing.

However, in order to prevent the screen 124 from buldging downwardly when subjected to the weight of a rodent or the like, and thereby causing possible separation or disjoinder of the screen 124 relative to the open bottom portion 122 of the housing 100, the bottom interior of the shallow tray 126 is provided with the aforementioned elongate raised ribs 132 which act to restrain the extent of buldging associated with the screen 124 when the latter is subjected to the weight of an animal. Of course, the ribs 132 may be constituted of rigid thermoplastic such as polystyrene or the like. However, when the means by which the edges of the screen 124 is connected to the open bottom portion 122 of the housing 100 is sufficient for preventing disjoinder of the screen 124 relative to the housing 100, the provision of the elongate raised ribs 132 is of lesser significance.

As discussed above, the depressed external concavity adjacent the right side face 108 of the housing 100 is for accommodating auxiliary or accessory structure for association with the primary housing 100. In this respect, an opening 136 is provided in the horizontal surface 112 of the concavity for accommodating, in slidably adjustable or telescopic relation, a cylindrical sleeve 138 having inner annular ribs 140, a free end which extends into the housing 100 proximate the screen 124, and spaced from the latter so that a rodent may enter the sleeve 138, and an opposite end flange of increased diameter 142 for resting upon the opening 136. Pursuant to one form of the present invention, there is provided an annular gasket or sleeve of generally elastomeric nature 144, which is generally T-shaped in vertical cross-section, for frictionally retaining an inner tube 146 likewise having annular ribs 148 in telescopic relation internally of the cylindrical sleeve 138. Each of the members 138 and 146 at the end portions thereof which are exposed respectively to the rodent confined in the housing 100, are provided with protective metallic rings 150 and 152 respectively as means for resisting gnawing by the confined rodents.

Accordingly, the inner tube 146 may be telescopically arranged internally of the cylindrical sleeve 138 so as to be brought toward and away from the screen 124 at the open bottom portion of the housing 100 into any elevation that the hobbyist so desires, the respective annular ribs 140 and 148, acting to permit the rodent to climb upwardly in a vertical direction through the inner tube 146 and sleeve 138. This feature will be further discussed below.

Beside the opening 136 there is provided an additional opening 154 of similar nature, the periphery of which is utilized for supporting a bottle support-sleeve 156 having an end flange 158 at the upper portion thereof for resting upon the periphery of the additional opening 154. The bottle support-sleeve 156 is provided at its opposite end with an aperture 160 extending through the generally rounded or hemispherical bottom end portion 162 thereof, for gnaw-resistant purposes, the sleeve 156 acting to contain in detachable or free resting relation, a bottle 164 or the like in which is provided feed substance, preferably of liquid nature, the bottle 164 having a tube 166 extending therefrom and projecting through the aperture 160 provided in the hemishperical bottom end 162 of the sleeve 156. Thus, the rodent may stand upwardly so as to suck upon the tube 166 so as to withdraw the feed substance therefrom.

Pursuant to one form of the present invention, there is provided an auxiliary or sub-housing 168, of shallow nature, which is preferably transparent, and possibly tinted colorwise for hiding purposes, the sub-housing 168 having a perforated metallic lid 170 detachably associated therewith in a conventional manner such as through the provision of detents and the like, or by dovetail connection. The sub-housing 168 may be provided with an opening formed in the base portion thereof for detachable association with the aforementioned inner tube 146 which is teliscopically arranged internally of the sleeve 138. The sub-housing 168 may be detachably secured to the inner tube 146 such as in press-fit relation through the intermediary of an appropriate elastomeric gasket or the like, and together with the inner tube 146, may be elevated to a position similar to that position illustrated in FIG. 4, relative to the housing 100, from the lowered position thereof, as illustrated in FIG. 1. In the position as referred to in FIG. 4, the rodent may climb upwardly through the raised inner tube 146 so as to reach the elevated sub-housing 168 for either observing his surroundings or hiding therein, especially when the sub-housing 168 is of tinted nature. Obviously, the depressed external concavity aforementioned, may readily accommodate the sub-housing 168, when the latter is in a lowered position and overlying the generally upper horizontal surface 112, so as to permit storage of the housing 100, or packaging and shipping of the housing 100 together with the sub-housing 168 adjustably secured thereto. The hobbyist simply need raise the inner tube 146 and sub-housing 168 supported thereon, relative to the housing 100 in a manner generally illustrated in FIG. 4 for making the assembly somewhat more interesting both from the hobbyist's and the rodent's standpoint.

Another significant feature of permitting the inner tube 146 to be brought downwardly within the housing 100 is the face that when the inner tube 146 is of sufficient extent so as to generally contact the screen 124, when the sub-housing 168 is in its lowermost position upon the external concavity aforementioned, a rodent will be entrapped within the sub-housing 168 and permit simple removal of the rodent, when necessary, from the arrangement without the hobbyist having to haphazardly grope within the housing 100 through the open top portion 118 of the latter housing upon removal of the perforated metallic plate 120 detachably secured thereto.

As generally illustrated in FIGS, 8, 16 and 18, the primary housing 100 may be utilized as a basis relative to which other sub-housings and the like may be communicated therewith through the intermediary of appropriate tubes in a manner as will be further discussed below. In order to permit interconnection of additional communicating tubes to the primary housing 100, the latter is provided with an opening 172 in the face 106 thereof, which opening 172 may be detachably closed by means of a metal blind plate 174, likewise perforated for air penetration, the metal blind plate 174 and opening 172 having associated conventional bayonet interlocking elements which permit insertion of the plate 174 into the opening 172 and a turning of the plate 174 relative to the opening 172 into a locked or unlocked condition. Clearly, the provision of the metal blind plate 174 serves to likewise resist gnawing of the opening 172 by the rodent.

Pursuant to a preferred form of the sub-housing 168, the latter is integrally interconnected to a tube 176 having a raised or upper cylindrical wall 178 which projects internally of the sub-housing 168 in a manner generally illustrated in FIG. 7 for confining waste, food or other matter in the latter. The elongate extent of the tube 176 externally of the sub-housing 176 may be of any desired length and may be telescopically arranged through the intermediary of an appropriate elastomeric gasket (not shown) internally of the inner tube 146 which is likewise telescopically arranged internally of the sleeve 138. The tube 176 should likewise be provided with annular ribs 180 or the like to permit a rodent to climb upwardly therealong and into the sub-housing 168. A significant feature of the present invention is to provide tubes generally denoted by the reference character 200, which are constituted generally of rigid thermoplastic and are likewise transparent and which may be interconnected to one another through the intermediary of elastomeric coupling sleeves 202 in a manner generally illustrated in FIGS. 4 and 5. In this respect, pursuant to one form of an elastomeric coupling sleeve 202, as illustrated in FIG. 5, the sleeve 202 is provided with an internal annular spacer 203 against which respective tubes 200 may abut at their respective end portions. Clearly, the provision of the elastomeric coupling sleeves 202 acts to permit or accommodate slight bending of the tubes 200 relative to one another at the elastomeric coupling sleeves 202 and thereby obviate the probability of fracture of the end portions of these tubes as adjoining one another.

The tubes 200 should preferably be provided as a pair of semi-annular mating portions 204A and 204B respectively each having associated therewith semi-annular internal ribs 206. Pursuant to one form of the semi-annular mating portions 204A and 204B, each is provided with a tongue 208 along one portion thereof and a groove 210 along the other portion thereof for mutually interfitting in associated tongue and grooves in the mate of the portions 204A and 204B respectively, as illustrated generally in FIGS. 10 and 11.

Pursuant to another form of the tubes 200 and elastomeric coupling sleeves, the semi-annular mating portions of the tubes 200, as illustrated in FIG. 9, and denoted by the reference characters 211A and 211B respectively, are provided with end portions which have an external semi-annular end ridge 212 for interfitting within respective internal annular grooves 214 provided in an alternate embodiment of the elastomeric coupling sleeve and denoted generally by the reference character 216, the sleeve 216 having an external annular groove 218 for enhancing the extent of deformation permitted by the sleeve 260 when the tubes 200 are bent relative to one another at the end portions as joined by the sleeve 216. Clearly, the sleeve 216 may expand slightly so as to permit penetration of the end portions of the tubes 200 which are provided with the external semi-annular ridges 212 for insertion into the respective internal annular grooves 214.

The significance of providing the tubes 200 with the mating portions thereof such as the portions 204A and 204B respectively, or the portions 211A and 211B respectively, is that these tubes when dismantled from the assembly such that the mating portions are separated from one another, will readily permit cleaning of the interior of these tubes of animal excrement and other debris which collect along the internally ribbed portions thereof during the natural course of use by the animal or rodent of the assembly. Obviously, the assembly must be cleansed periodically of the debris as the debris tends to collect therein and often presents the assembly with an undesirable odor. Clearly, when the tubes 200 are separated into their mating portions, the interior thereof may be readily cleaned easily and effectively in a manner which is not otherwise permitted by tubes of entirely cylindrical extent in which are provided ribs or the like.

Figure 15:
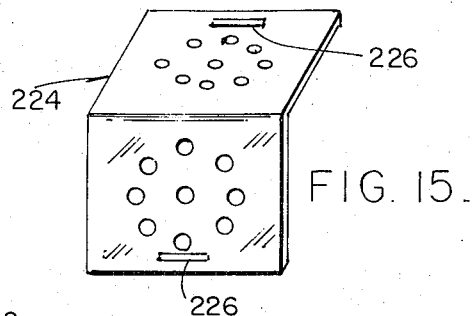
FIG. 15 illustrates a perspective view of a metallic doorway for association with a generally L-shaped access opening illustrated in FIG. 14.
Figure 14:
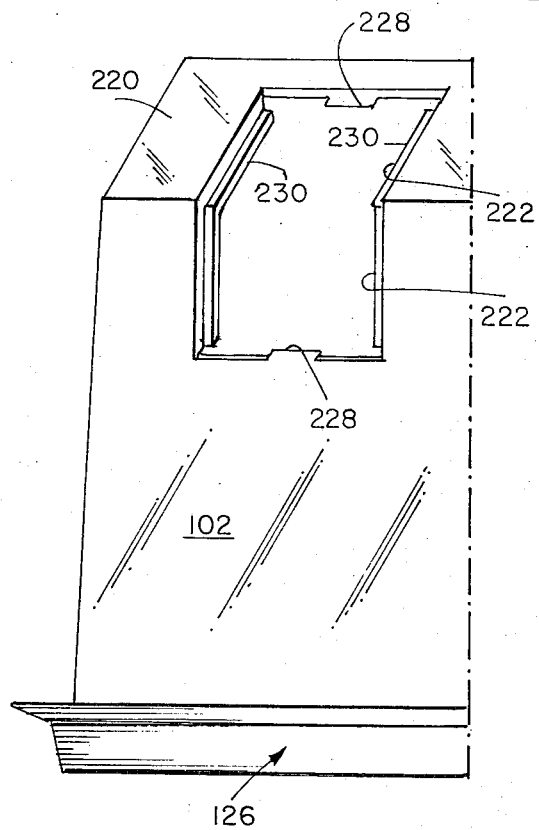
FIG. 14 illustrates a fragmentary perspective view of the housing illustrated in FIG. 12.
Figure 13:
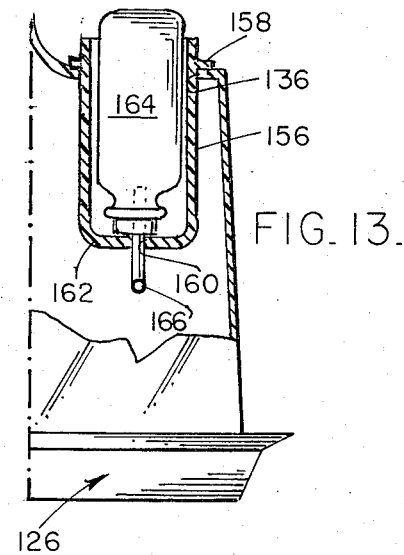
FIG. 13 illustrates a fragmentary elevational cross-sectional view taken along the line 13—13 in FIG. 12.
Figure 12:
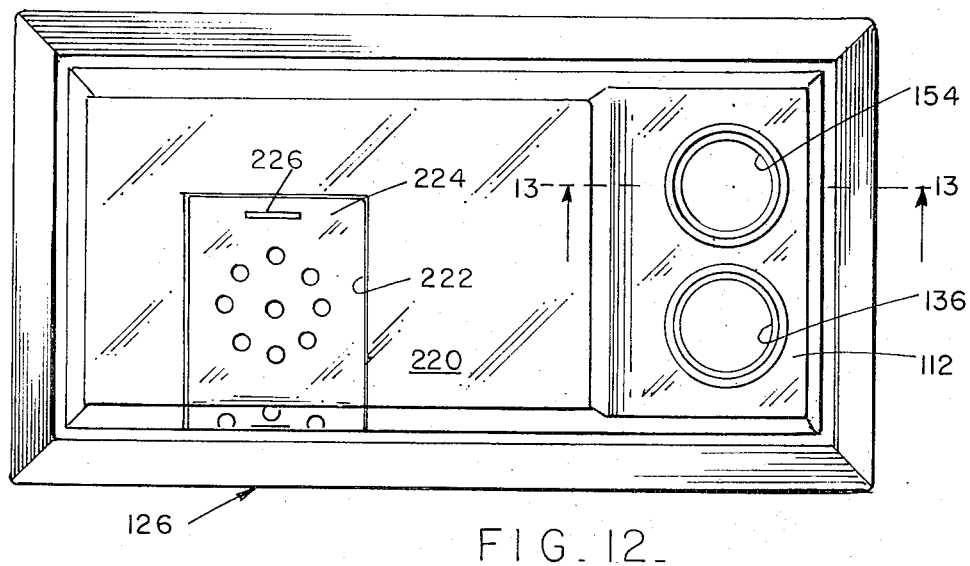
FIG. 12 illustrates a top plan view of the primary housing pursuant to an alternate embodiment thereof.

Pursuant to an alternate embodiment of the primary housing 100, the latter is provided with a generally closed uppermost surface 220 as illustrated in FIG. 14. In this respect, a generally L-shaped access opening 222 is provided or formed as part of the uppermost closed surface 220 and the adjacent front surface 102, the access opening 222 being closable such as by means of a conformingly L-shaped perforated metal door 224 as illustrated in FIG. 15. The metal door 224 may be provided with detents 226 or the like, whereas the opposite portions of the acccess openings 222 may be provided with tabs 228 or the like which interlock in snap-fit relation generally with the detents 226 provided in the metal door 224. Moreover, the metal door 224 may rest upon appropriately provided L-shaped shoulders provided inwardly or below the surfaces 220 and 102. Accordingly, access into the primary housing 100 is readily permitted by simply detaching the L-shaped perporated metal door 224 from the upper portion of the housing 100.

As discussed above, the screen 124 should be slightly spaced in parallel relation with the bottom interior of the tray 126 and this feature may be readily observed in FIG. 17. In this respect, an internally projecting ridge 240 extends along and inwardly of each of the vertical wall portions of the tray 126 and cooperate in generally snap-fit relation with a generally outer horizontal ledge 242 provided along the external periphery of the bottom portion of the housing 100, the inner ridges 240 of the tray 126 being deformed slightly outwardly relative to the bottom portion of the housing 100 because of the generally elastomeric nature of the tray 126.

Moreover, the internal periphery of the bottom portion of the housing 100 adjacent the screen 124 is provided with an inner ridge 144 or the like spaced slightly vertically below the aforementioned horizontal ledge 242 of the housing 100 for accommodating therebetween the periphery of the screen 124 in generally detachable, yet fixed relation. Thus, the screen 124 which should be constituted preferably of metal, will withstand the weight of an animal moving therealong without buldging downwardly into contact with the bottom interior of the tray 126 when the screen 124 is sufficiently rigid and appropriately interfitted along the inner ridge 244 as aforementioned. Clearly, when the screen 124 is sufficiently rigid for withstanding the weight of an animal, the provision of the elongate ribs 132 along the bottom interior of the tray 126 is unnecessary.

Referring now to FIGS. 16 and 18, the present invention contemplates the provision of further auxiliary sub-housings 260 each having a bottom screen 261 and associated with a shallow tray 262 in a manner discussed above for the primary housing 100, each of the sub-housings furthermore being provided with an access opening 264 with which is associated a removable perforated plate 266 for access thereinto respectively. Furthermore, each of the sub-housings 260 is provided with tube-connecting openings 268 which may be closed by means of a perforated metal blind 270 associated with the openings 268 respectively in bayonet fashion as aforementioned. Clearly, when the tube-connecting openings 268 are not to be utilized, such as the leftmost opening 268 illustrated in FIG. 16, the perforated metal blind 270 acts to close the opening and resist gnawing of the opening.

However, when the tube-connecting openings 268, such as the righmost opening for the sub-housing tube 260 illustrated in FIG. 16, are to be used, then the associated metal blind 270 is removed and a respective tube constituted of the portions 204A and 204B or 211A and 211B is inserted into the perspective opening for communication with the sub-housing 260.

Accordingly, each of the sub-housings 260 are provided with one or a plurality of these tube-connecting openings 268 so that they may be arranged relative to one another and relative to the primary housing 100 in a manner illustrated both in FIGS. 16 and 18 respectively. Obviously, certain of the openings 268, especially those which are provided in the uppermost horizontal surface of each of these sub-housings 260, may be utilized likewise for accommodating therein a bottle support-sleeve 156 in a manner likewise illustrated in FIG. 18.

Referring further to FIGS. 8 and 18, the present invention contemplates the utilization of T-shaped coupling members denoted generally by the reference character 272. These coupling members 272 may be provided with a generally tri-pod array of communicating branches for accommodating respective end portions of the tubes 200 in a manner illustrated in FIG. 20, or alternatively may be provided with respective external annular ridges 274 respectively upon which may be press-fit an elastomeric sleeve 216 provided internally with the annular grooves 214 respectively as illustrated in FIG. 19. In the latter instance, the members 272 may themselves be split into two mating portions with one another, in a manner generally similar to the tubes 200 having the portions 204A and 204B respectively or the portions 211A and 211B respectively, and be maintained in mating or opposing relationship with one another by means of the elastomeric gaskets 216 connected to the respective branches thereof.

As illustrated in FIGS. 21 and 22 respectively, two further embodiments of the arrangement by which the mating portions of the tubes 200 may be mated with one another are contemplated. In this request, the elongate end faces of the tubes 204A and 204B respectively may be generally of a flat extent in a manner illustrated in FIG. 22 so as to abut one another flushly and maintain an orientation relative to one another by means of the elastomeric gaskets or sleeves 202 or the like positioned along the opposite end portions thereof. However, as illustrated in FIG. 21, the opposing elongate faces of the portions 204A and 204B respectively, may be provided with cut-outs which interfit with one another in a manner similar to a tongue and groove but are referred to herein as a generally ship-lap interconnection whereby the portion 204A having a pair of interior cut-outs 276 acts to receive mating male portions formed as part of the exterior cut-outs 278 respectively provided in the segments or portions 204B respectively. In this instance, likewise the portions 204A and 204B are restrained against separation from one another by providing the elastomeric sleeves 202 or the like at the opposite end portions thereof.

It should be understood that the utilization of the tees, tubes, and housings, as arranged in communicating relationship requires the closing of various openings at the end portions of the tubes, tees or sub-housings, and this obviously is permitted by utilization of the elastomeric sleeves which accommodate therein metal blind discs, such as the discs 270, within the annular grooves which may be formed therein respectively.

Accordingly, the arrangements, as illustrated in the various FIGURES of the drawings, refer to an animal habitat which may be arranged, dismantled, stored or otherwise used in almost any selective manner that a hobbyist so desires. Each and every one of the components of the animal habitat, pursuant to the present invention, may be readily cleaned, and permit entrapment of an animal in an isolated area without the animal being permitted to escape during the cleansing process, whether the cleansing process relates to cleansing of the tubes themselves or the housings as provided for communication with one another. Clearly, the rodent is encouraged to explore his surroundings, utilizing the confined passageways offered by the communicating tubes or use of interior accessories such as exercising wheels 300 illustrated in phantom in FIG. 16 and, thus, the rodent itself is much more interesting to maintain and observe within a generally entirely transparent arrangement with little possibility of escaping.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An animal habitat comprising an at least partially transparent housing which includes an open bottom portion; a screen connected across said open bottom portion; tray means operatively associated with said open bottom portion for receiving the latter in detachable relation, said screen acting to generally isolate and maintain an animal in said housing from said tray means when the latter is either attached or detached from said housing; means for defining an adjustable passageway communicating with the interior of said housing, said adjustable passageway including tube segments each constituted by a pair of mating semi-cylindrical portions associated detachable with one another in generally annularly abutting relation, each of said semi-cylindrical portions being provided with an internally ribbed concavity and associated ones of said semi-cylindrical portions being mated in ship-lap relation; and at least one sub-housing detachably associated with said tube segments and having a bottom portion through and above which a litter-retaining tube segment projects partially.

2. An animal habitat as claimed in claim 1 wherein said tray means is a shallow tray and said open bottom portion includes means for maintaining a substantial portion of said screen in generally slightly spaced parallel relation with a bottom interior of said tray.

3. An animal habitat as claimed in claim 2 wherein the bottom interior of said tray includes a partially raised portion for contacting said screen and reenforcing the latter against deforming downwardly when subjected to the weight of an animal.

4. An animal habitat as claimed in claim 1 wherein said tray includes an upper surrounding auxiliary litter-confining flange flaring upwardly and outwardly away from said housing.

5. An animal habitat as claimed in claim 1 wherein said screen is provided with grid openings each having an extent of at least one-quarter inch for readily permitting conformingly sized litter particles to pass freely therethrough.

6. An animal habitat as claimed in claim 1 wherein said tray means is constituted of elastically deformable thermoplastic for permitting detachable snap-fit insertion of said open bottom portion of said housing thereinto.

7. An animal habitat comprising an at least partially transparent housing for confining an animal, said housing having an opening formed in a top surface thereof, and conduit means detachably associated with said opening for defining a lengthwise adjustable passageway communicating with the interior of said housing and accessible to the animal, said adjustable passageway projecting downwardly through said opening in said top surface of said housing so that a lower open end of said passageway is slidably positionable between proximate and remote spaced locations relative to a bottom surface of said housing, said conduit means comprising a tube of adjustable length and further comprising a sub-housing connected to said tube and movable together with the latter from the raised position above said top surface to a lowered position approximately overlying said bottom surface of said housing.

8. An animal habitat as claimed in claim 7 wherein said adjustable passageway includes a plurality of tube segments adjustably associated with one another telescopically.

9. An animal habitat as claimed in claim 7 wherein said adjustable passageway includes tube segments each constituted by a pair of mating semi-cylindrical portions associated detachably with one another in generally annularly abutting relation.

10. An animal habitat as claimed in claim 9 including elastomeric sleeves interposed between telescopically associated tube segments for retaining frictionally the tube segments as telescopically adjusted to withstand the weight of an animal climbing upwardly therethrough.

11. An animal habitat as claimed in claim 9 wherein each of said semi-cylindrical portions is provided with an internally ribbed concavity.

12. An animal habitat as claimed in claim 11 wherein each of said semi-cylindrical portions is associated with its mate in ship-lap relation.

13. An animal habitat as claimed in claim 7 wherein said housing is constituted of generally rigid transparent thermoplastic and includes an internally projecting gnaw-resistant accessory-support convexity having a radius of curvature of at least one-half inches.

14. An animal habitat as claimed in claim 7 wherein said housing has a width substantially less than the height and length thereof for maintaining an animal in clearly observable close proximity to a transparent front portion of said housing.

15. An animal habitat as claimed in claim 7 wherein said housing includes an open bottom portion, tray means operatively associated with said open bottom portion, and an upper portion having a lesser length and width than said open bottom portion, said tray means having a greater length and width than said open bottom portion and being constituted of generally abrasion-resistant elastomeric material for withstanding rubbing and absorbing impact when packaged together with said housing therein.

16. An animal habitat as claimed in claim 7, wherein said sub-housing includes an upper generally horizontal surface which extends generally in a near co-planar relation with said top surface of said housing when said sub-housing is in said lowered position thereof.

17. An animal habitat as claimed in claim 16, wherein said tube to which is connected said sub-housing includes internally roughened surface means for permitting an animal to climb upwardly therein.

18. An animal habitat as claimed in claim 16, wherein said tube is generally transparent and of sufficient elongate extent for contacting said bottom surface of said housing when said sub-housing is in said lowered position thereof, thereby permitting entrapment of an animal in said tube and sub-housing.

19. An animal habitat as claimed in claim 18, wherein said housing is provided with at least one further gnaw-resistant closable opening, and including further tubes, and means for assembling said further tubes in both series in parallel communication with both said further closable opening in said housing and said sub-housing.

20. An animal habitat as claimed in claim 19, wherein the latter said means includes respective tees and elbows each having a pair of mating segments and secured to one another with respective elastomeric sleeves.

21. An animal habitat as claimed in claim 7, further comprising an additional opening in said top surface of said housing; and means for detachably supporting feed-substance in said additional opening.

22. An animal habitat as claimed in claim 21, wherein said feed-substance means includes a detachable elongate sleeve having an apertured lowered-rounded gnaw-resistant end through which detachably projects a feed tube from a feed-substance carrying-bottle.

23. An animal habitat as claimed in claim 7, wherein said length adjustable conduit means comprises a plurality of communicating tubes; and elastomeric coupling means configured to snappingly engage respective end portions of two communicating tubes.

24. An animal habitat as claimed in claim 23, wherein each tube has an annular rim at its respective end portions, and said coupling means comprises a flexible elastomeric coupling sleeve provided with two spaced annular grooves adapted to snappingly receive the rims of two communicating tubes.

25. An animal habitat as claimed in claim 7, wherein said conduit means comprises a pair of elongate semi-annular mating portions which together define an elongate cylindrical tube.

26. An animal habitat as claimed in claim 7, wherein said conduit means are provided with spaced annular internal ribs along its length, whereby the animal may engage said ribs for improved traction.

27. An animal habitat as claimed in claim 7, wherein said conduit means comprises a plurality of communicating tubes together defining a passageway having portions thereof directed in different directions.

28. An animal habitat as claimed in claim 7, wherein said housing has a further opening, and wherein said conduit means comprises a plurality of tubes associated with said opening for defining a lengthwise adjustable passageway exteriorly of said housing which communicates at respective ends thereof with the interior of said housing, whereby the animal may leave said housing through one opening therethrough and return through said passageway into said housing through the other opening.

29. An animal habitat comprising an at least partially transparent housing for confining an animal, said housing having an opening formed therein, and conduit means detachably associated with said opening for defining a lengthwise adjustable passageway communicating with the interior of said housing and accessible to the animal, said housing including a top portion which defines an external concavity having an upper generally horizontal surface, said housing also having a lower generally horizontal surface, and a rounded transition surface joining the upper and lower horizontal surfaces to one another, said opening being provided in said lower horizontal surface, said conduit means comprising a tube slidably adjustable vertically in said opening and a sub-housing connected to said tube and movable together with the latter from a raised position above said upper horizontal surface at a lowered position approximately overlying said lower horizontal surface.

30. An animal habitat as claimed in claim 29 wherein said shallow sub-housing includes an upper generally horizontal surface which extends generally in near coplanar relation with said upper horizontal surface of said housing when said subhousing is in said lowered position thereof.

31. An animal habitat as claimed in claim 30 wherein said tube to which is connected said sub-housing includes internally roughened surface means for permitting an animal to climb upwardly therein.

32. An animal habitat as claimed in claim 30 wherein said tube is generally transparent and of sufficient elongate extent for contacting said screen in said housing when said sub-housing is in said lowered position thereof, thereby, permitting entrapment of an animal in said tube and sub-housing.

33. An animal habitat as claimed in claim 32 wherein said housing is provided with at least one further gnaw-resistant closable opening, and including further tubes, and means for assembling said further tubes in both series and parallel communication with both said further closable opening in said housing and said sub-housing.

34. An animal habitat as claimed in claim 33 wherein the latter said means includes respective tees and elbows each having a pair of mating segments and secured to one another with respective elastomeric sleeves.

35. An animal habitat as claimed in claim 29 wherein said lower generally horizontal surface of said housing is provided with an additional opening proximate the first said opening, and means for detachably supporting feed-substance in said additional opening.

36. An animal habitat as claimed in claim 35 wherein the latter said means includes a detachable elongate sleeve having an apertured lower-rounded gnaw-resistant end through which detachably projects a feed-tube from a feed-substance carrying-bottle.

37. An animal habitat comprising an at least partially transparent housing for confining an animal, said housing having an opening formed therein, and length adjustable conduit means detachably associated with said opening for defining a lengthwise adjustable passageway communicating with the interior of said housing and accessible to the animal, said conduit means being formed of generally rigid and transparent thermoplastic material, said conduit means comprising a pair of elongate semi-annular mating portions which together define an elongate cylindrical tube, each of said mating portions having two spaced elongate portions, one of said elongate portions being provided with a tongue, said other elongate portion being provided with a groove configurated to receive said tongue when said mating portions are assembled to define the cylindrical tube.

38. An animal habitat as claimed in claim 37, wherein said mating portions are provided with similarly disposed tongues and grooves along respective elongate portions to thereby make said mating portions identical and interchangeable.

39. An animal habitat comprising an at least partially transparent housing for confining an animal, said housing being provided with an opening in a top surface thereof; a vertically disposed elongate tube adjustable lengthwise in the vertical direction detachably associated with said opening for defining a lengthwise adjustable passageway of said housing and accessible to the animal, said elongate tube being formed of generally rigid and transparent thermoplastic material; and an auxiliary housing having an opening formed therein and spaced from said first-mentioned housing, said elongate tube being associated with the opening in both said housings for defining a lengthwise adjustable passageway communicating with the interiors of said housings, said auxiliary housing being supported by the top end portion of said elongate tube, whereby the interiors of each of said housings, is accessible to the animal irrespective of the spacing between said housings and whereby the animal must climb upwardly inside the elongate tube to leave the first-mentioned housing and enter said auxiliary housing.

* * * * *